United States Patent
Huang et al.

(10) Patent No.: US 9,559,569 B2
(45) Date of Patent: Jan. 31, 2017

(54) ARRANGEMENT FOR COOLING AN ELECTRIC MACHINE WITH A LAYER OF THERMALLY CONDUCTING AND ELECTRICALLY INSULATING MATERIAL

(75) Inventors: Hao Huang, Troy, OH (US);
Xiaochuan Jia, Centerville, OH (US);
Paul James Wirsch, Jr., Springboro, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 478 days.

(21) Appl. No.: 13/371,657

(22) Filed: Feb. 13, 2012

(65) Prior Publication Data

US 2013/0207395 A1 Aug. 15, 2013

(51) Int. Cl.
| | | |
|---|---|---|
| H02K 9/00 | (2006.01) |
| H02K 3/00 | (2006.01) |
| H02K 3/34 | (2006.01) |
| H02K 3/46 | (2006.01) |
| H02K 9/19 | (2006.01) |
| H02K 3/30 | (2006.01) |
| H02K 9/22 | (2006.01) |
| H02K 3/24 | (2006.01) |
| H02K 3/32 | (2006.01) |
| H02K 3/38 | (2006.01) |
| H02K 5/20 | (2006.01) |

(52) U.S. Cl.
CPC ...... *H02K 9/19* (2013.01); *H02K 3/30* (2013.01); *H02K 9/22* (2013.01); *H02K 3/24* (2013.01); *H02K 3/325* (2013.01); *H02K 3/38* (2013.01); *H02K 5/20* (2013.01); *H02K 2213/03* (2013.01)

(58) Field of Classification Search
CPC .................................. H02K 3/24; H02K 9/22
USPC ......... 310/58, 198, 201–203, 206, 215, 260, 310/270
See application file for complete search history.

(56) References Cited

U.S. PATENT DOCUMENTS

| | | | |
|---|---|---|---|
| 1,448,700 A * | 3/1923 | Seidner ........................... 310/54 |
| 2,904,708 A * | 9/1959 | Willyoung ...................... 310/64 |
| 3,965,378 A * | 6/1976 | Liebe et al. .................... 310/65 |
| 4,262,224 A | 4/1981 | Kofink et al. | |
| 4,311,932 A | 1/1982 | Olson | |
| 4,352,034 A | 9/1982 | Karhan et al. | |
| 4,496,862 A | 1/1985 | Weber | |
| 4,647,804 A | 3/1987 | Wefel | |
| 4,647,805 A | 3/1987 | Flygare et al. | |
| 4,779,017 A | 10/1988 | Eckels | |
| 4,799,017 A | 1/1989 | Siebold et al. | |

(Continued)

FOREIGN PATENT DOCUMENTS

| | | |
|---|---|---|
| EP | 0785612 A1 | 7/1997 |
| GB | 2061629 A | 5/1981 |

(Continued)

*Primary Examiner* — Jose Gonzalez Quinones
(74) *Attorney, Agent, or Firm* — GE Global Patent Operation; William S. Munnerlyn

(57) ABSTRACT

An assembly for a gas turbine engine includes a S/G having a rotatable shaft, a main machine, a PMG, and an exciter wherein at least one of the main machine, PMG, and exciter includes a rotor mounted to the shaft and having multiple rotor poles, a stator having multiple stator poles and at least one of the rotor poles and stator poles being formed by a core with a post and wire wound about the post to form a winding, with the winding having at least one end turn, and a layer to increase cooling capabilities of a portion of at least one of the stator and the rotor.

15 Claims, 5 Drawing Sheets

(56) References Cited

U.S. PATENT DOCUMENTS

| | | | |
|---|---|---|---|
| 4,816,708 A | 3/1989 | Laumond | |
| 4,862,022 A | 8/1989 | Khutoretsky et al. | |
| 4,943,746 A | 7/1990 | Scherzinger et al. | |
| 4,982,122 A | 1/1991 | Rowe et al. | |
| 5,034,639 A | 7/1991 | Huss et al. | |
| 5,072,145 A | 12/1991 | Davis et al. | |
| 5,091,666 A | 2/1992 | Jarczynski | |
| 5,122,704 A | 6/1992 | Blakeley et al. | |
| 5,140,204 A * | 8/1992 | Cashmore et al. | 310/61 |
| 5,189,325 A * | 2/1993 | Jarczynski | 310/54 |
| 5,196,749 A | 3/1993 | Palma et al. | |
| 5,220,233 A | 6/1993 | Birch et al. | |
| 5,237,227 A | 8/1993 | Huss | |
| 5,293,089 A | 3/1994 | Frister | |
| 5,347,188 A | 9/1994 | Iseman et al. | |
| 5,523,635 A | 6/1996 | Ferreira et al. | |
| 5,548,168 A | 8/1996 | Laskaris et al. | |
| 5,554,898 A | 9/1996 | Howard et al. | |
| 5,578,879 A | 11/1996 | Heidelberg et al. | |
| 5,798,586 A | 8/1998 | Adachi | |
| 5,869,912 A | 2/1999 | Andrew et al. | |
| 5,889,342 A | 3/1999 | Hasebe et al. | |
| 5,898,246 A | 4/1999 | Hoffman | |
| 5,903,073 A | 5/1999 | Mukai | |
| 5,906,236 A | 5/1999 | Adams et al. | |
| 5,939,808 A | 8/1999 | Adames | |
| 5,949,171 A | 9/1999 | Horski et al. | |
| 6,046,520 A | 4/2000 | Betsch et al. | |
| 6,160,332 A | 12/2000 | Tsuruhara | |
| 6,211,586 B1 * | 4/2001 | Hediger et al. | 310/52 |
| 6,304,011 B1 | 10/2001 | Pullen et al. | |
| 6,351,045 B1 | 2/2002 | Shoykhet | |
| 6,441,518 B1 | 8/2002 | Yockey et al. | |
| 6,483,210 B1 | 11/2002 | Soderberg | |
| 6,488,486 B1 | 12/2002 | Debleser | |
| 6,489,697 B1 | 12/2002 | Ozawa et al. | |
| 7,208,854 B1 | 4/2007 | Saban et al. | |
| 7,687,928 B2 | 3/2010 | Taneja et al. | |
| 2003/0080636 A1 | 5/2003 | Boardman et al. | |
| 2003/0193256 A1 | 10/2003 | Liebermann | |
| 2005/0206166 A1 | 9/2005 | Ganev et al. | |
| 2006/0163954 A1 | 7/2006 | Biais | |
| 2007/0278869 A1 | 12/2007 | Taketsuna | |
| 2008/0042502 A1* | 2/2008 | VanLuik et al. | 310/89 |
| 2008/0185924 A1 | 8/2008 | Masoudipour et al. | |
| 2008/0223557 A1 | 9/2008 | Fulton et al. | |
| 2009/0072654 A1* | 3/2009 | Hatano et al. | 310/215 |
| 2010/0072863 A1 | 3/2010 | Robinson et al. | |
| 2010/0102652 A1 | 4/2010 | Booth et al. | |
| 2010/0139896 A1 | 6/2010 | Chamberlin et al. | |
| 2010/0237723 A1 | 9/2010 | Gerstler et al. | |
| 2010/0264759 A1 | 10/2010 | Shafer et al. | |
| 2010/0289386 A1 | 11/2010 | Gerstler et al. | |
| 2011/0012447 A1 | 1/2011 | Himmelmann | |
| 2011/0252807 A1* | 10/2011 | Huang et al. | 60/788 |
| 2012/0025639 A1* | 2/2012 | Zywot et al. | 310/54 |

FOREIGN PATENT DOCUMENTS

| | | | |
|---|---|---|---|
| JP | 63213464 A | * | 9/1988 |
| JP | 63213464 A | * | 9/1988 |
| JP | 10257703 A | * | 9/1998 |
| WO | 2011087433 A1 | | 7/2011 |

* cited by examiner

ARRANGEMENT FOR COOLING AN ELECTRIC MACHINE WITH A LAYER OF THERMALLY CONDUCTING AND ELECTRICALLY INSULATING MATERIAL

BACKGROUND OF THE INVENTION

Contemporary aircraft engines include starter/generator (S/G) systems, which are used to both start an aircraft engine, and to utilize the aircraft engine after it has started in a generator mode to provide electrical energy to power systems on the aircraft. Such contemporary systems may be liquid cooled, wet cavity systems or liquid cooled, dry cavity systems. Both contemporary types of systems have their advantages and disadvantages including that the liquid cooled, dry cavity systems generally have less losses, higher efficiency, higher reliability, less required maintenance, and attitude independence over the liquid cooled, wet cavity systems. However, the power density of the wet cavity electric machine is considerably higher than that of the dry cavity electric machine due to its higher cooling effectiveness.

BRIEF DESCRIPTION OF THE INVENTION

In one embodiment, an electric machine includes a rotor having multiple rotor poles, a stator having multiple stator poles, at least one of the rotor poles and stator poles being formed by a core with a post and wire wound about a post to form a winding, with the winding having at least one end turn, and a layer of thermally conducting and electrically insulating materially provided adjacent the winding.

In another embodiment, an assembly for a gas turbine engine includes an accessory gearbox comprising a drive gear, a S/G mechanically mounted to the accessory gearbox having a rotatable shaft, a pinion gear carried by the shaft, a main machine carried by the shaft, a permanent magnet generator (PMG) carried by the shaft, an exciter carried by the shaft, wherein at least one of the main machine, PMG, and exciter includes a rotor mounted to the shaft and having multiple rotor poles, a stator having multiple stator poles, at least one of the rotor poles and stator poles being formed by a core with a post and wire wound about a post to form a winding, with the winding having at least one end turn, and a layer of thermally conducting and electrically insulating materially provided adjacent the winding.

DESCRIPTION OF EMBODIMENTS OF THE INVENTION

Figure 1:
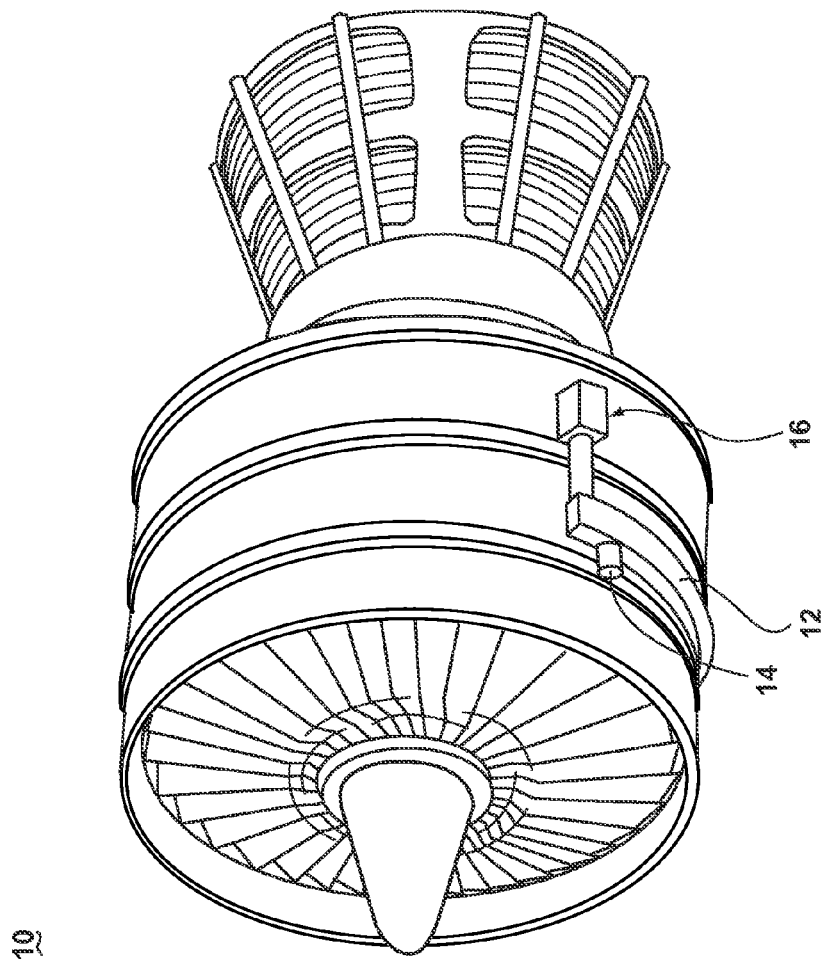
FIG. 1 is a perspective view of a gas turbine engine having a S/G according to an embodiment of the invention.

FIG. 1 illustrates a gas turbine engine 10 having an accessory gear box (AGB) 12 and a S/G 14 according to an embodiment of the invention. The AGB 12 may be coupled to a turbine shaft (not shown) of the gas turbine engine 10 by way of a mechanical power take off 16. The gas turbine engine 10 may be any suitable gas turbine engine used in modern commercial and military aviation or it could be a variety of other known gas turbine engines such as a turboprop or turboshaft. The type and specifics of the gas turbine engine 10 are not germane to the invention and will not be described further herein.

Figure 2:
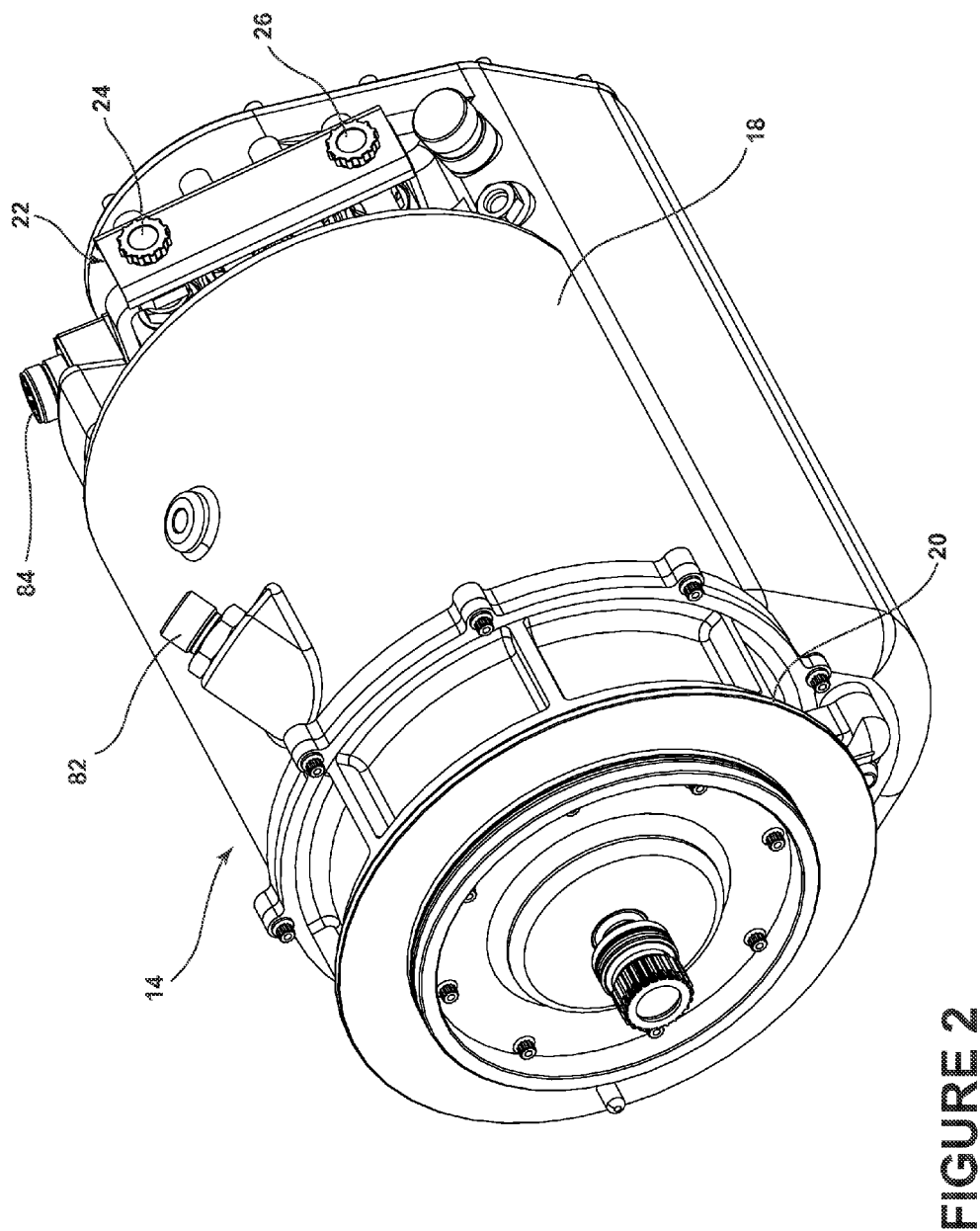
FIG. 2 is a perspective view of an exterior of the S/G of FIG. 1.

FIG. 2 more clearly illustrates the S/G 14 and its housing 18, which may include a clamping interface 20, used to clamp the S/G 14 to the AGB 12. Multiple electrical connections may be provided on the exterior of the S/G 14 to provide for the transfer of electrical power to and from the S/G 14. The electrical connections may include a first power connector assembly 22 having electrical power connections 24 and 26, which may be connected by cables to an electrical power distribution node of an aircraft having the gas turbine engine 10 to power various items on the aircraft, such as lights and seat-back monitors.

Figure 3:
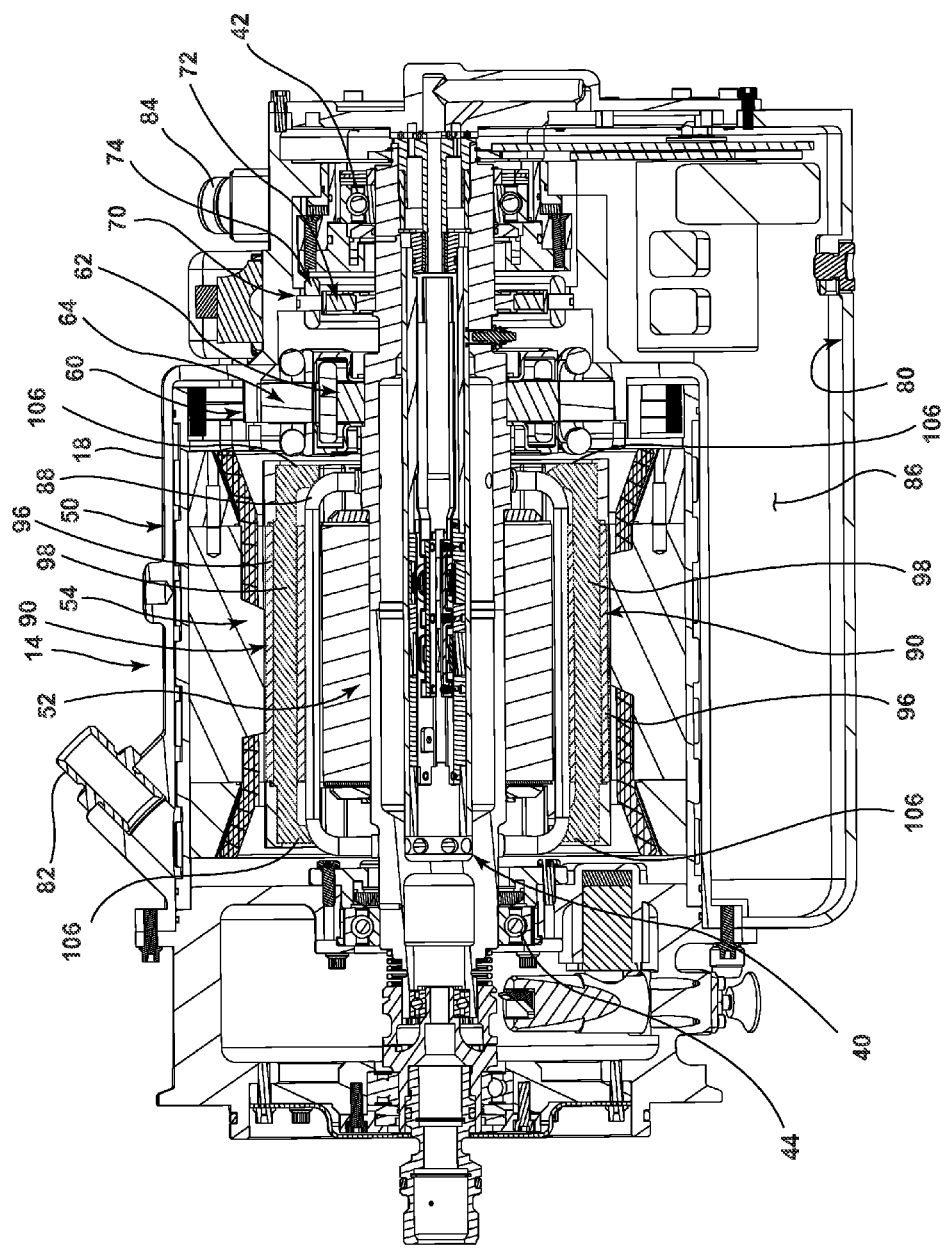
FIG. 3 is a schematic cross-sectional view of the S/G of FIG. 2 having a main machine, exciter, and permanent magnet generator (PMG)

The interior of the S/G 14 is best seen in FIG. 3, which is a sectional view of the S/G 14. A rotatable shaft 40 is located within the S/G 14 and is the primary structure for supporting a variety of components. The diameter of the rotatable shaft 40 may be fixed or vary along the length of the rotatable shaft 40. The rotatable shaft 40 is supported by spaced bearings 42 and 44. Several of the components of the S/G 14 have a fixed component and a rotating component, with the rotating component being provided on the rotatable shaft 40. Examples of these components may include a main machine 50, an exciter 60, and a PMG 70, with the corresponding rotating component comprising a main machine rotor 52, an exciter rotor 62, and a PMG rotor 72, respectively, and the corresponding fixed component comprising a main machine stator 54, an exciter stator 64, and a PMG stator 74. In this manner, the main machine rotor 52, exciter rotor 62, and PMG rotor 72 may include the rotatable shaft 40. The fixed components may be mounted to any suitable part of the housing 18. Each of the main machine stator 54, exciter stator 64, and PMG stator 74 defines an interior through which the rotatable shaft 40 extends.

It will be understood that each of the main machine rotor 52, exciter rotor 62, and PMG rotor 72 may have multiple rotor poles and that each of the main machine stator 54, exciter stator 64, and PMG stator 74 may have multiple stator poles such that magnetic fields may be produced and the S/G 14 may operate through the interaction of the magnetic fields and current-carrying conductors to generate force. At least one of the rotor poles and stator poles may be formed by a core with a post and wire wound about the post to form a winding, with the winding having at least one end turn. The exciter 60 may provide direct current to the windings of the main machine 50 and the main machine 50 and PMG 70 may supply AC electrical power when the rotatable shaft 40 rotates.

The components of the S/G 14 may be any combination of known generators. For example, the main machine 50 may be either a synchronous or asynchronous generator. In addition to the accessories shown in this embodiment, there may be other components that may need to be operated for particular applications. For example, in addition to the electromechanical accessories shown, there may be other accessories driven from the same rotatable shaft 40 such as an oil pump, a fluid compressor, or a hydraulic pump.

The S/G 14 may be oil cooled and thus may include an oil cooling system 80 having an oil inlet port 82 and an oil outlet port 84 for controlling the supply of oil to the oil cooling system 80. The cooling oil may be used to dissipate heat generated by the electrical and mechanical functions of the S/G 14. The oil system 80 may also provide for lubrication of the S/G 14. In the illustrated embodiment, the S/G 14 may be a liquid cooled, dry cavity system having an oil cooling system illustrated as including an oil reservoir 86 and various cooling passages 88 (only partially shown). The rotatable shaft 40 may provide oil flow paths for the main machine rotor 52, exciter rotor 62, and PMG rotor 72. In a dry cavity generator, no cooling oil is permitted to contact the insulation system used in the S/G 14. This dry cavity approach improves reliability over typical wet cavity designs in which oil is permitted to contact nonmetallic materials, such as the S/G insulation system. In the dry cavity approach, the insulation system is not degraded because there is no direct impingement of hot oil on the windings. The workings of an S/G 14 having a liquid cooled, dry cavity system are known in the art, which includes the disclosure in U.S. Pat. No. 7,687,928, issued Mar. 30, 2010, entitled Dual-Structured Aircraft Engine Starter/Generator, which is incorporated herein by reference.

A problem with prior dry cavity approaches is that the stator end windings may retain unwanted heat, resulting in reduced performance or output. The embodiments of the invention address this problem by using a layer of thermally conducting and electrically insulating material to significantly increase the stator end turn cooling capability and the rotor winding cooling capability over contemporary embodiments. In general, a material is either a conductor or an insulator as each type of material allows electric charge to flow through it to a certain extent. The measure of how receptive a material is to electric current is called the conductivity and those materials with a high conductivity are called conductors while those with a low conductivity are called insulators. Objects designed to have low resistance so that they transfer current with the least loss of electrical energy are called conductors. In contrast, contemporary stator end turns and rotor windings are insulated with very low thermal conductivity materials causing a majority of the heat losses including the heat losses in the windings and end turns to go through the rotor and stator cores to reach the oil cooling system. For exemplary purposes, the remainder of this application will focus on the stator portion and rotor portion of the main machine 50; however, it will be understood that the following explanation may also be applied to the stator and rotor portions of the exciter 60 and the PMG 70.

Figure 4:
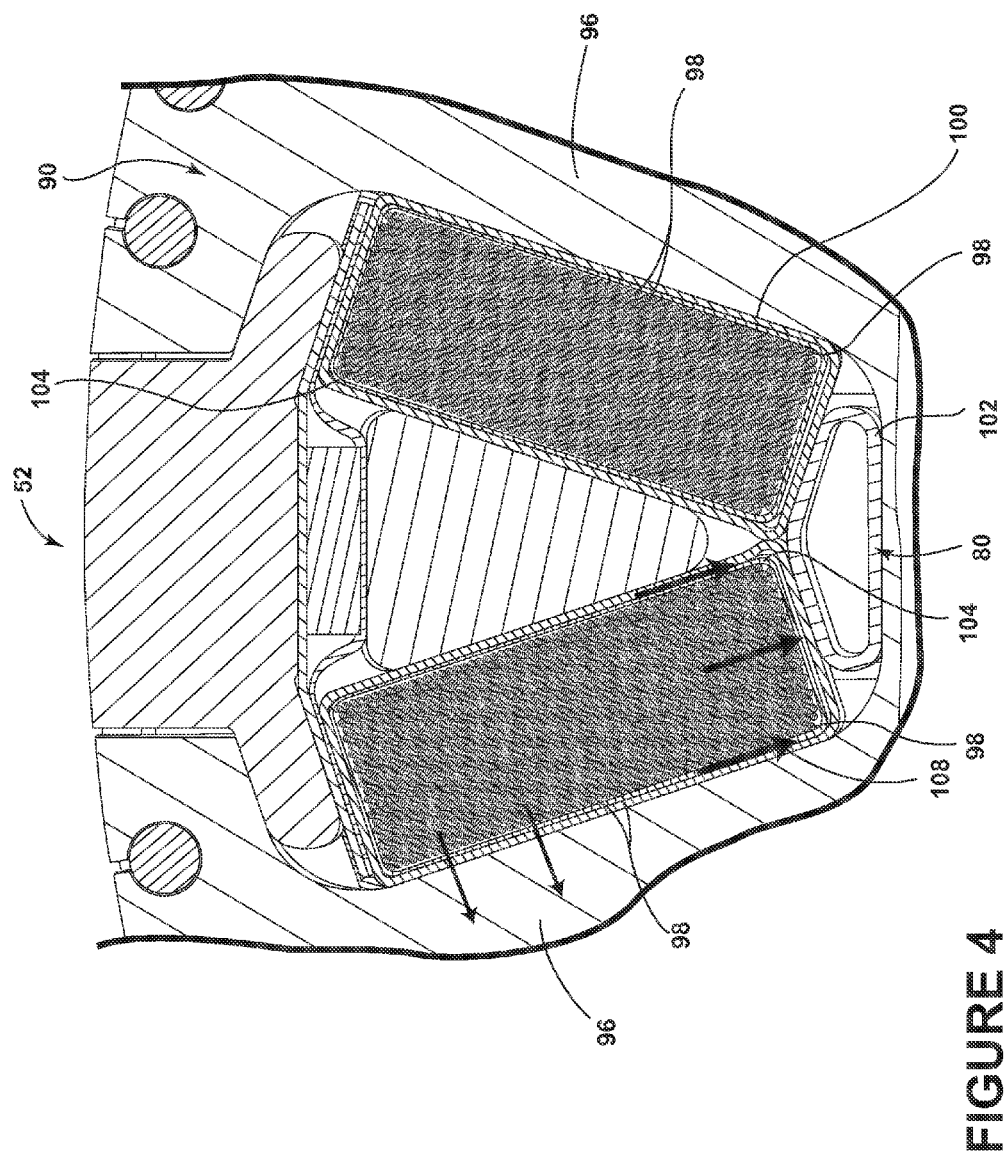
FIG. 4 is a sectional view of a portion of the rotor of the main machine of the S/G of FIG. 2.

It may be seen in FIG. 3 that the main machine rotor 52 includes a core 90 having a post 96. Windings 98 are formed when wire is wound about the post 96 and the winding segment that extends across either the front or rear of the post 96 forms at least one end turn 106. FIG. 4 is a section view of the main machine rotor 52 and further illustrates the core 90, post 96, and windings 98, as well as cooling fins 100, a cooling tube 102, and a thermally conductive, electrically insulative layer 104. It will be understood that only a portion of the windings 98 have been shown and that another portion extends along the other side of the post 96. In the illustrated portion, the oil cooling system 80 includes the at least one cooling circuit or cooling tube 102 passing through the core 90 to exchange heat with the core 90 without wetting the windings 98. The cooling system may include at least one cooling fin mounted to a portion of the at least one cooling circuit. In the illustrated example, the cooling fins 100 may be copper cooling fins, which may be welded on the cooling tube 102 such that the cooling tube 102 may transfer heat from the windings 98 to the cooling oil in the cooling tube 102.

The layer 104 may be formed from a thermally conducting and electrically insulating material provided between the windings 98 and the cooling fins 100 to significantly increase the rotor winding cooling capability and direct the heat losses, indicated by arrows 108, to the cooling tube 102. The thermally conductive, electrically insulative layer 104 may be formed from a variety of materials including boron nitride, aluminum nitride, and aluminum oxide, or a similar material. It is also contemplated that the layer 104 may include a mixture that includes at least one of these materials. For example, the layer 104 may include a mixture including boron nitride. It is contemplated that the layer 104 may be in the form of a varnish or other coating such that the windings 98 may be coated with the mixture. Further, both a distinct layer and a varnish layer may on the windings 98 may form the layer 104 and provide thermal conductivity and electrical insulation.

It is contemplated that the layer 104 may have a variety of properties that may aid in increasing the rotor winding cooling capability. For example, the layer may have a thermal conductivity greater than 0.75 W/mC. The layer 104 may have a minimum dielectric strength of 250 V/mil. The layer 104 replaces conventional thermal insulation barriers, which prevent the heat losses of the windings from traveling to the oil cooling media of the cooling system and allows for a significant increase in the capability to cool the rotor windings 98.

Figure 5:
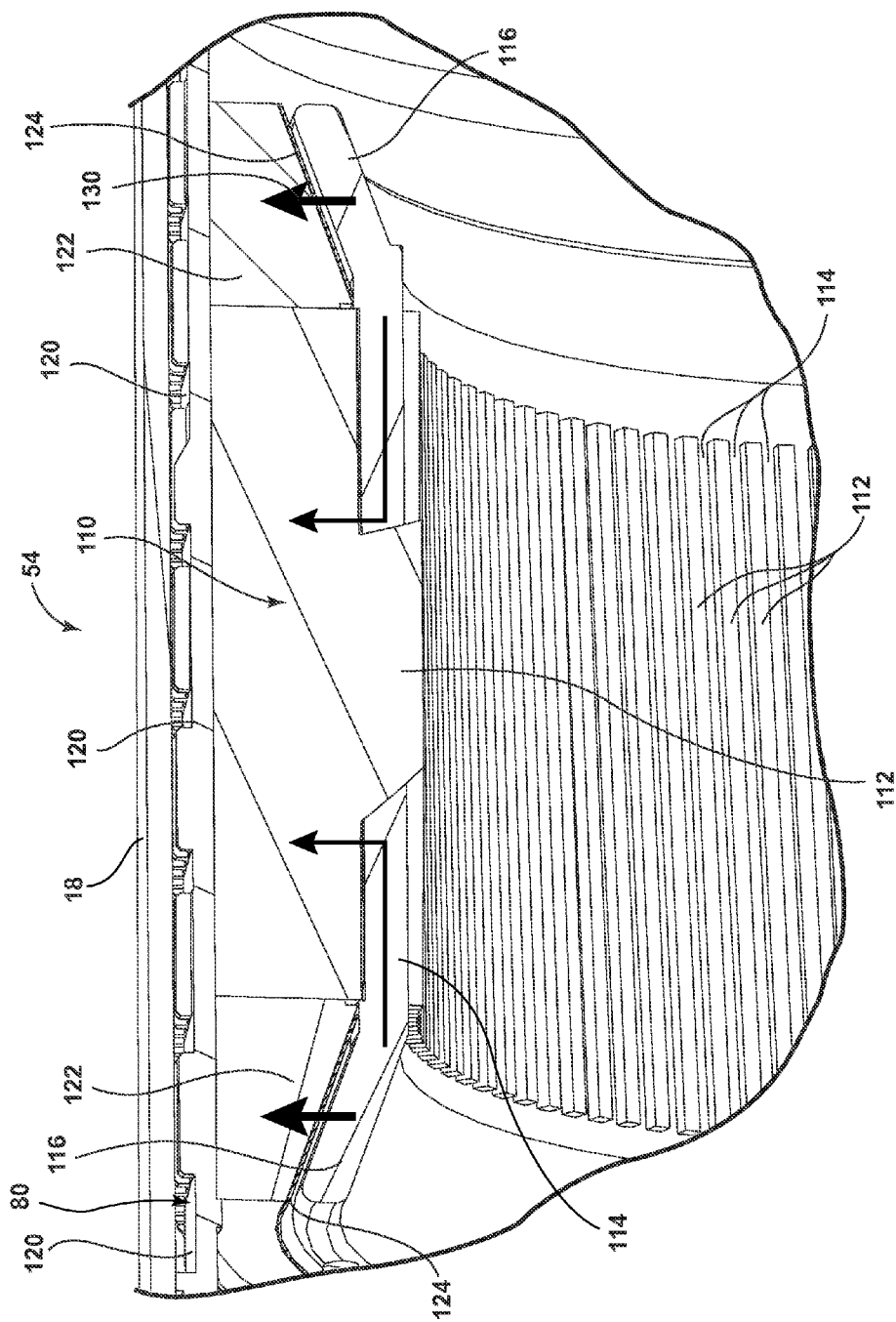
FIG. 5 is a sectional view of the stator of the main machine of the S/G of FIG. 2.

FIG. 5 illustrates a section view of the main machine stator 54, which includes a core 110 having a number of posts 112, windings 114 having end turns 116, oil cooling passages 120, coil supports 122, and a thermally conductive, electrically insulative layer 124. Wire may be wound about each of the posts 112 to form the windings 114. The windings 114 have been illustrated as forming end turns 116 at either end of the posts 112. At least one coil support 122 may be mounted adjacent the cooling system to support the main machine stator 54. In the illustrated portion, two coil supports 122 are illustrated and may be made from aluminum or a similar material in terms of weight density, structure strength, and thermal conductivity. Further, the oil cooling system 80 includes the at least one cooling circuit or cooling passage 120 passing through a jacket surrounding the core 110 to exchange heat with the core 110 without wetting the windings 114.

The layer 124 may be formed from a thermally conducting and electrically insulative material. The thermally conductive, electrically insulative layer 124 may be formed from a variety of materials including boron nitride, aluminum nitride, and aluminum oxide, or a similar material. It is also contemplated that the layer 124 may include a mixture that includes at least one of these materials. For example, the layer 124 may include a mixture including boron nitride. As illustrated, there may be multiple end turns 116 and the layer 124 may be provided adjacent each of the end turns 116. More specifically, the layer 124 is illustrated as being located between the end turns 116 and each of the coil supports 122. It is contemplated that the layer 124 may be in the form of a varnish or other coating such that the end turns 116 may be coated with the varnish. It is also contemplated that both a thermally conductive, electrically insulative varnish and a separate thermally conductive, electrically insulative layer may be used to form the layer 124. This results in heat losses, schematically illustrated as arrows 130, including the heat losses 130 in the end turns going through the coil supports 122 instead of the majority going through the stator core 110 to reach the oil cooling passages 120.

For both the main machine rotor 52 and the main machine stator 54, it is contemplated that there may be multiple end turns. Further, there may be multiple windings, with each winding having at least one end turn to form the multiple end turns. Further yet, each of the multiple windings may have multiple end turns. Although the above embodiments have been described in terms of a S/G for a gas turbine engine, such a layer of thermally conducting and electrically insulating material as described above may be used in any electric machine to significantly increase at least one of the stator cooling capability and the rotor cooling capability. It will be understood that in such an electric machine the rotor may have multiple rotor poles and the stator may have multiple stator poles wherein at least one of the rotor poles and stator poles is formed by a core with a post and wire wound about the post to form a winding, with the winding having at least one end turn and a layer of thermally conducting and electrically insulating material provided adjacent the winding, which may include the end turn.

The embodiments described above provider for a variety of benefits including that they have higher efficiency, high reliability, less maintenance, all-attitude operation, and lower weight. The embodiments described above also result in an increase in the power density of the dry cavity machine by 15-20%, which puts the power density of the dry cavity S/G on par with that of a wet cavity and still keeps all the advantages of the conventional dry cavity at the same time. It is believed that the embodiments described above will be approximately seven pounds lighter than contemporary dry cavity S/Gs and four pounds lighter than contemporary wet cavity S/Gs. Such a weight reduction is important in a turbine engine environment and provides a competitive advantage during flight. The reduced maintenance will lead to lower operating costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:
a rotor having a set of rotor poles;
a stator having a set of stator poles;
at least one rotor pole in the set of rotor poles being formed by a rotor core with a post and wire wound about the post to form a rotor winding, with the rotor winding having at least one end turn;
at least one stator pole in the set of stator poles being formed by a stator core with a post and wire wound about the post to form a stator winding, with the stator winding having at least one end turn;
a liquid cooling conduit passing through the at least one rotor core, proximate to the at least one winding;
a layer of thermally conducting and electrically insulating material encircling the rotor winding and provided between a thermally conductive cooling fin and the rotor winding, and the thermally conductive cooling fin encircling the insulating material and provided between the insulating material and the conduit,
wherein the insulating material abuts both the rotor winding and the thermally conductive cooling fin to increase the thermal conduction from the rotor winding to the liquid cooling conduit whereby liquid coolant passing through the liquid cooling conduit will dissipate heat from the rotor winding, and the thermally conductive cooling fin is mounted to a portion of the liquid cooling conduit, and the layer of thermally conducting and electrically insulating material has a conductivity equal to or greater than about 0.75 W/mC;
a cooling system having at least one cooling passage passing through a jacket surrounding the stator core;
at least one coil support mounted between the cooling passage and the at least one end turn of the stator core, wherein the coil support is conform-coated with a layer of thermally conducting and electrically insulating material to exchange heat from the end turn through the coil support to the cooling passage without wetting the stator winding.

2. The electric machine of claim 1 wherein there are multiple end turns and the layer of thermally conducting and electrically insulating material is provided between each of the end turns of stator winding and the at least one coil support.

3. The electric machine of claim 2 wherein there are multiple windings, with each winding having at least one end turn to form the multiple end turns.

4. The electric machine of claim 3 wherein each of the multiple windings has multiple end turns.

5. The electric machine of claim 4 wherein the layer comprises a mixture including boron nitride.

6. The electric machine of claim 1 wherein the layer has a minimum dielectric strength of 250 V/mil.

7. The electric machine of claim 1 wherein the layer comprises boron nitride.

8. The electric machine of claim 7 wherein the layer comprises a mixture including boron nitride.

9. The electric machine of claim 8 wherein the winding is coated with the mixture.

10. The electric machine of claim 1 wherein the rotor further comprises a rotatable shaft.

11. The electric machine of claim 10 wherein the stator defines an interior through which the rotatable shaft extends.

12. The electric machine of claim 1 wherein the electric machine is one of a main machine, an exciter, and a permanent magnet generator.

13. An assembly for a gas turbine engine comprising: an accessory gearbox;
a starter/generator mechanically mounted to the accessory gearbox, comprising:
a rotatable shaft;
a main machine carried by the shaft;
a permanent magnet generator (PMG) carried by the shaft;
an exciter carried by the shaft;
wherein at least one of the main machine, PMG, and exciter comprises: a rotor mounted to the shaft and having at least one rotor pole, and
a stator having at least one stator pole,
the at least one rotor pole being formed by a rotor core with a post and wire wound about the post to form a rotor winding, with the rotor winding having at least one end turn, and the stator pole being formed by a stator core with a post and wire wound about the post to form a stator winding, with the stator winding having at least one end turn;

a liquid cooling conduit passing through the rotor core, proximate to the winding;

a layer of thermally conducting and electrically insulating material encircling the rotor winding and provided between a thermally conductive cooling fin and the winding, the thermally conductive cooling fin encircling the insulating material and provided between the insulating material and the conduit;

wherein the insulating material abuts both the rotor winding and the thermally conductive cooling fin to increase the thermal conduction from the rotor winding to the liquid cooling conduit whereby liquid coolant passing through the liquid cooling conduit will dissipate heat from the rotor winding, the thermally conductive cooling fin is mounted to a portion of the liquid cooling conduit, and the layer of thermally conducting and electrically insulating material has a conductivity equal to or greater than about 0.75 W/mC;

a cooling system having at least one cooling passage through a jacket surrounding the stator core;

at least one coil support mounted between the cooling passage and the at least one end turn of the stator core, wherein the coil support is conform-coated with a layer of thermally conducting and electrically insulating material to exchange heat from the end turn through the coil support to the cooling passage without wetting the stator winding.

14. The assembly of claim 13 wherein the layer has a minimum dielectric strength of 250 V/mil.

15. The assembly of claim 14 wherein the layer comprises boron nitride.

* * * * *